(12) United States Patent
Malaya et al.

(10) Patent No.: US 11,880,715 B2
(45) Date of Patent: *Jan. 23, 2024

(54) METHOD AND SYSTEM FOR OPPORTUNISTIC LOAD BALANCING IN NEURAL NETWORKS USING METADATA

(71) Applicant: Advanced Micro Devices, Inc., Santa Clara, CA (US)

(72) Inventors: Nicholas Malaya, Austin, TX (US); Yasuko Eckert, Bellevue, WA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 173 days.

This patent is subject to a terminal disclaimer.

(21) Appl. No.: 17/222,543

(22) Filed: Apr. 5, 2021

(65) Prior Publication Data

US 2021/0224130 A1 Jul. 22, 2021

Related U.S. Application Data

(63) Continuation of application No. 16/019,374, filed on Jun. 26, 2018, now Pat. No. 10,970,120.

(51) Int. Cl.
*G06F 9/50* (2006.01)
*G06N 3/082* (2023.01)

(52) U.S. Cl.
CPC ............ *G06F 9/5044* (2013.01); *G06F 9/505* (2013.01); *G06F 9/5066* (2013.01); *G06N 3/082* (2013.01)

(58) Field of Classification Search
None
See application file for complete search history.

(56) References Cited

U.S. PATENT DOCUMENTS

| | | | |
|---|---|---|---|
| 9,916,283 B2 | 3/2018 | Zaribafiyan | |
| 10,019,668 B1 | 7/2018 | Woo | |
| 2016/0335119 A1 | 11/2016 | Merrill et al. | |
| 2017/0344882 A1 | 11/2017 | Ambrose et al. | |
| 2018/0068044 A1 | 3/2018 | Erickson | |
| 2018/0082181 A1 | 3/2018 | Brothers et al. | |

FOREIGN PATENT DOCUMENTS

JP 2013-503398 A 1/2013

OTHER PUBLICATIONS

"Latte: a Language, Compiler, and Runtime for Elegant and Efficient Deep Neural Networks", Leonard Truong et al.; Programming Language Design and Implementation, ACM, 2 Penn Plaza, Suite 701, New York, NY 10121-0701 (US) Jun. 2, 2016; pp. 209-223, XP058259802.

"Automatically Scheduling Halide Image Processing Pipelines", Ravi Teja Mullapudi et al.; ACM Transactions on Graphics, ACM, NY (US) vol. 35, No. 4, Jul. 11, 2016, pp. 1-11, XP058275790.

Sze, V. et al., "Efficient Processing of Deep Neural Networks: A Tutorial and Survey", 32 pgs, Aug. 13, 2017 (downloaded from /arxiv.org).

*Primary Examiner* — Eric C Wai
(74) *Attorney, Agent, or Firm* — Volpe Koenig

(57) ABSTRACT

Methods and systems for load balancing in a neural network system using metadata are disclosed. Any one or a combination of one or more kernels, one or more neurons, and one or more layers of the neural network system are tagged with metadata. A scheduler detects whether there are neurons that are available to execute. The scheduler uses the metadata to schedule and load balance computations across compute resources and available resources.

18 Claims, 9 Drawing Sheets

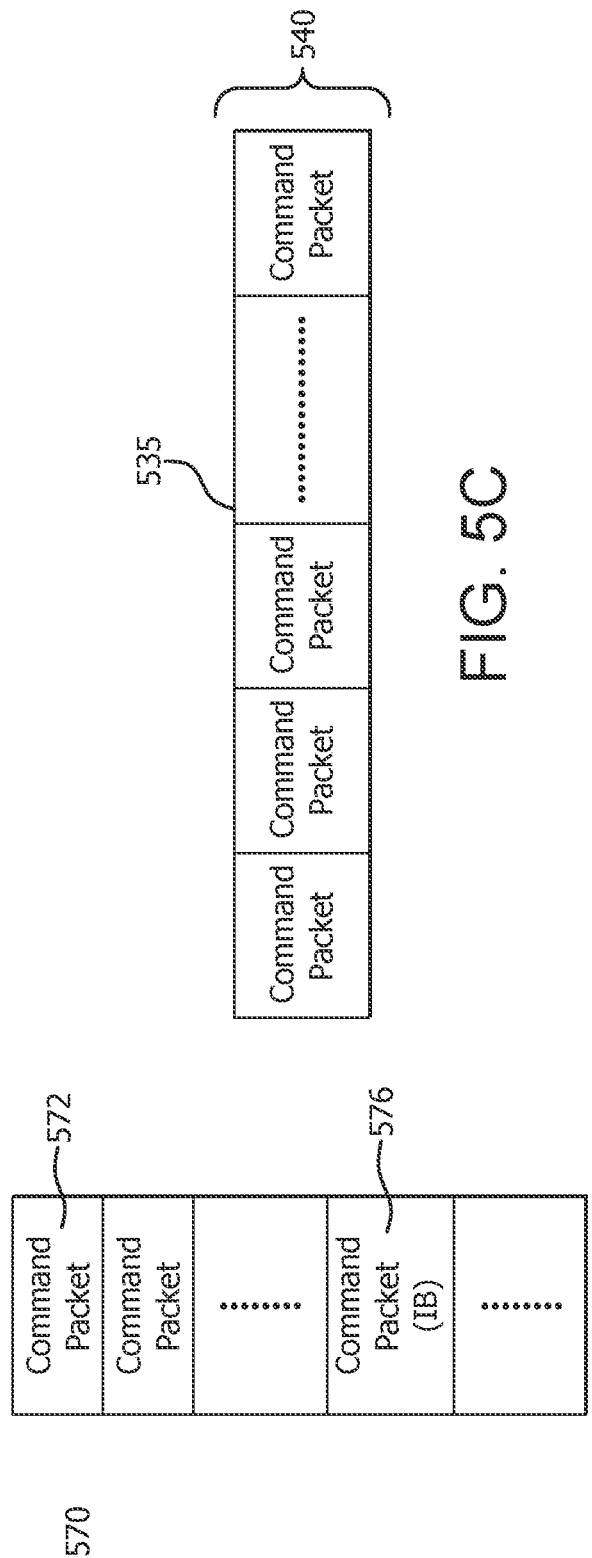

METHOD AND SYSTEM FOR OPPORTUNISTIC LOAD BALANCING IN NEURAL NETWORKS USING METADATA

CROSS REFERENCE TO RELATED APPLICATION

This application is a continuation of U.S. patent application Ser. No. 16/019,374, filed Jun. 26, 2018, which is incorporated by reference as if fully set forth.

BACKGROUND

Deep neural networks (DNNs) are used for many artificial intelligence and machine learning applications. These DNNs nominally include multiple hidden layers between an input layer and an output layer. Recently, DNNs have started to use an increasing number of layers which provide increased capacity and accuracy for various prediction problems in image, video, and speech recognition processing and analysis. However, deeper DNNs also result in increasingly greater performance challenges.

For example, DNNs are extremely computationally expensive. It is not uncommon for the training task for a neural network to require days, weeks or even months to be performed. These DNNs are massively parallel and require large throughput devices to be effectively resolved. However, most DNNs at present are serialized between layers. Many DNNs have over 100 such layers, making this a significant limitation to increased parallelism.

One common technique termed "layer-fusion" permits exposing more than one layer to simultaneous computation, but this requires explicit programming to enable. Programmers expose a compiler to the entire computation across the layers. However, layer-fusion is not rigorous but opportunistic, and no compiler presently has the capability to identify that subsequent layers may have sufficient computational demands to warrant beginning to compute them earlier. Furthermore, this approach is difficult. The programmer must expose the compiler to the entire computation across layers. This is considered extremely challenging to program and is not intuitive (i.e., the abstract concept of layers can be lost in the process). Outside of specialized implementations of layer fusion in highly optimized libraries, the layers are implicitly serialized.

Even if optimized, this network would not be transferable to many other networks with substantially different connectivity, network architectures, different hardware capabilities, etc. Furthermore, the process of optimization is error-prone, time-intensive, and expensive to implement. Additionally, even when several layers are fused, it does not expose the entire computational graph, just the fused layers. Finally, dynamic edits to the neural network during runtime, such as pruning, cannot be leveraged by this approach. This is important because pruning alters the computational intensity of pruned layers.

BRIEF DESCRIPTION OF THE DRAWINGS

A more detailed understanding may be had from the following description, given by way of example in conjunction with the accompanying drawings wherein:

FIG. 5B shows an example element that includes command packets and an indirect buffer (IB) command packet in accordance with certain implementations;

FIG. 5C is an example indirect buffer in accordance with certain implementations;

DETAILED DESCRIPTION

Described herein is a method and system for opportunistic load balancing in deep neural networks (DNNs) using metadata. The parallelism of DNN computations is fully leveraged by exposing the entire graph of computations or at least portions thereof to a hardware scheduler, compiler, dispatcher or operating system (O/S) scheduler (collectively "scheduler"). In an implementation, computation kernels, neurons, layers or other architectural, functional or computational aspects, portions, characteristics and/or features of the DNN are tagged with metadata so that the scheduler can more effectively and intelligently predict computational complexity, and load balance across existing resources. These metadata provide basic information on the computational complexity of the computation kernel, permitting accurate load balancing. For example, convolutional neural networks, which exhibit repeated computations with regularity and frequency, are particularly amenable to improved load balancing and job scheduling. However, the method is applicable to other types of networks that have regular computational patterns. In an implementation, the method is applicable to dataflow-like architectures, where explicitly exposing the entire computational graph permits fully leveraging the parallelism inherent in DNNs.

Figure 1:
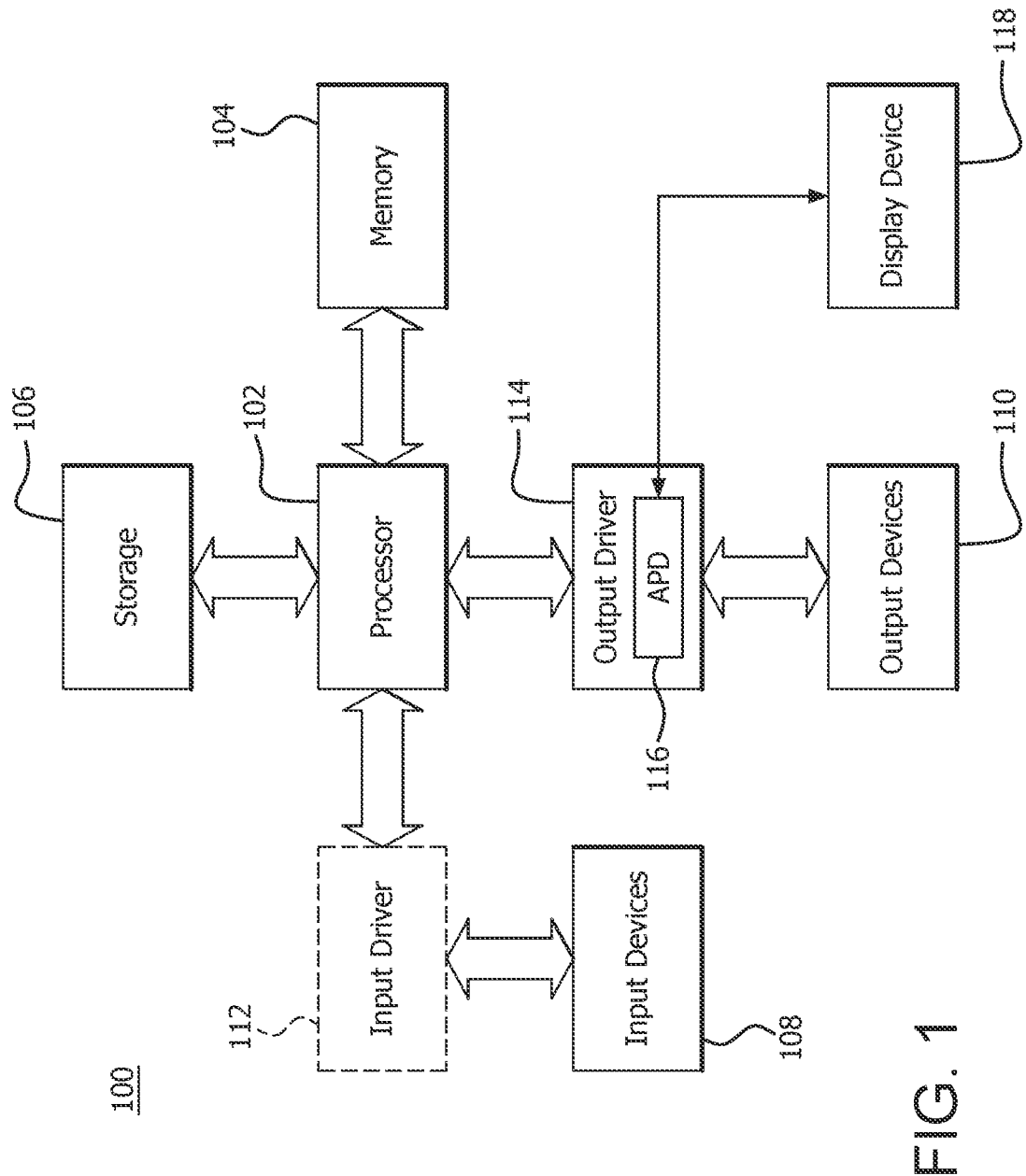
FIG. 1 is a block diagram of an example device in accordance with certain implementations.

FIG. 1 is a block diagram of an example device 100 in which one or more features of the disclosure can be implemented. The device 100 includes, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 also optionally includes an input driver 112 and an output driver 114. It is understood that the device 100 includes additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 116 includes an accelerated processing device ("APD") 116 which is coupled to a display device 118. The APD accepts compute commands and graphics rendering commands from processor 102, processes those compute and graphics rendering commands, and provides pixel output to display device 118 for display.

As described in further detail below, the APD 116 includes one or more parallel processing units to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are, in some cases, not driven by a host processor (e.g., processor 102) and in some implementations provide (graphical) output to a display device 118. For example, it is contemplated that any processing system that performs processing tasks in accordance with a SIMD paradigm can perform the functionality described herein. Alternatively, it is contemplated that computing systems that do not perform processing tasks in accordance with a SIMD paradigm performs the functionality described herein.

Figure 2:
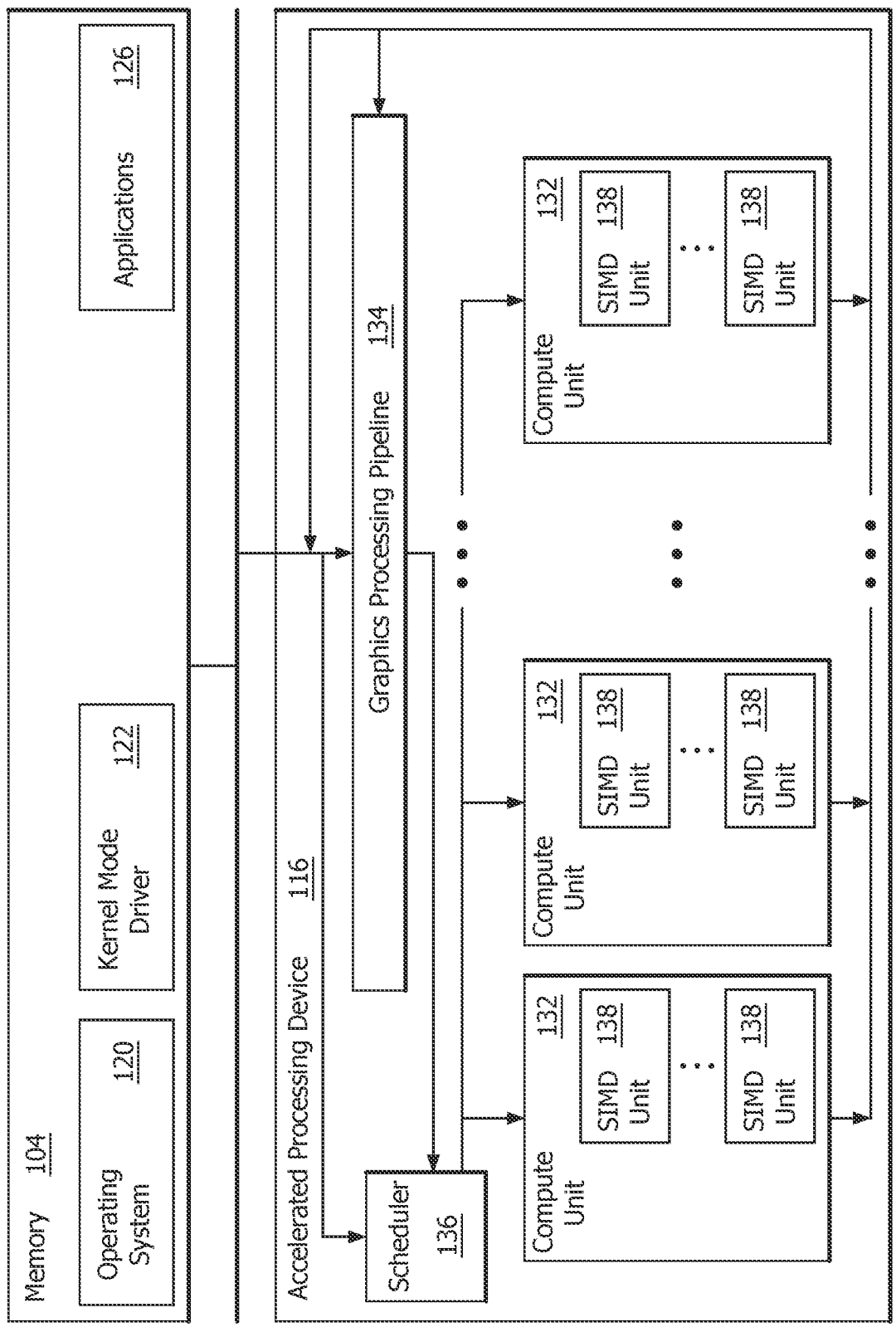
FIG. 2 is a block diagram of the device of FIG. 1 in accordance with certain implementations.

FIG. 2 is a block diagram of the device 100, illustrating additional details related to execution of processing tasks on the APD 116. The processor 102 maintains, in system memory 104, one or more control logic modules for execution by the processor 102. The control logic modules include an operating system 120, a kernel mode driver 122, and applications 126. These control logic modules control various features of the operation of the processor 102 and the APD 116. For example, the operating system 120 directly communicates with hardware and provides an interface to the hardware for other software executing on the processor 102. The kernel mode driver 122 controls operation of the APD 116 by, for example, providing an application programming interface ("API") to software (e.g., applications 126) executing on the processor 102 to access various functionality of the APD 116. The kernel mode driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations that are suited for parallel processing and/or non-ordered processing. The APD 116 is used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but executes that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow. In an implementation, each of the compute units 132 can have a local L1 cache. In an implementation, multiple compute units 132 share a L2 cache.

The basic unit of execution in compute units 132 is a work-item. Each work-item represents a single instantiation of a program that is to be executed in parallel in a particular lane. Work-items can be executed simultaneously as a "wavefront" on a single SIMD processing unit 138. One or more wavefronts are included in a "work group," which includes a collection of work-items designated to execute the same program. A work group is executed by executing each of the wavefronts that make up the work group. In alternatives, the wavefronts are executed sequentially on a single SIMD unit 138 or partially or fully in parallel on different SIMD units 138. A wavefront can be thought of as the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into two or more wavefronts which are parallelized on two or more SIMD units 138 or serialized on the same SIMD unit 138 (or both parallelized and serialized as needed). A scheduler 136 performs operations related to scheduling various wavefronts on different compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

Figure 3:
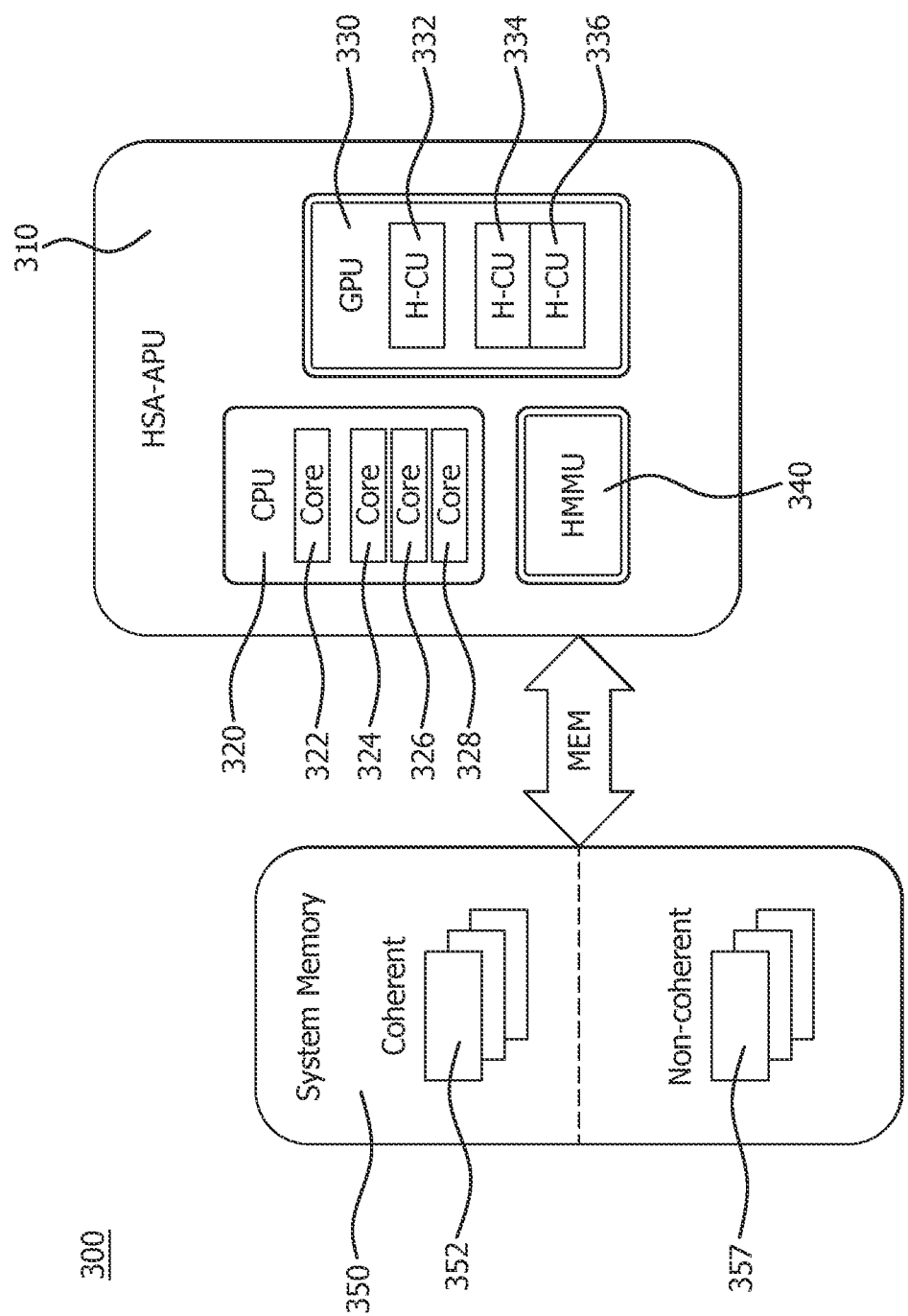
FIG. 3 is a block diagram of an Heterogeneous System Architecture (HSA) platform in accordance with certain implementations.

FIG. 3 illustrates a Heterogeneous System Architecture (HSA) platform 300 based in part on the devices of FIGS. 1 and 2. The HSA platform 300 includes a HSA Accelerated Processing Unit (APU) 310 connected to or in communication with (collectively "connected to") a system memory 350. The HSA APU 310 contains a multi-core CPU 320, a GPU 330 with multiple HSA compute units (H-CUs) 332, 334, 336, and a HSA memory management unit (HMMU or HSA MMU) 340. The CPU 320 includes any number of cores, with cores 322, 324, 326, 328 shown in FIG. 3. The GPU 330 includes any number of H-CUs although three are shown in FIG. 3. While a HSA is discussed and presented in the described implementations, the present system and method can be utilized on either a homogenous or heterogeneous system. The system memory 350 includes one or both of coherent system memory 352 and non-coherent system memory 357.

The HSA 300 provides a unified view of fundamental computing elements. The HSA 300 allows a programmer to write applications that seamlessly integrate CPUs 320, also referred to as latency compute units, with GPUs 330, also referred to as throughput compute units, while benefiting from the best attributes of each. The HSA 300 allows the programmer to take advantage of the parallel processor in the GPU 330 as a peer to the traditional multi-threaded CPU 320. A peer device is defined as an HSA device that shares the same memory coherency domain as another device.

The devices in the HSA 300 communicate with one another using queues as further explained with reference to FIGS. 4-6. Queues are an integral part of the HSA architecture. A queue is a physical memory area where a producer places a request or task for a consumer. Depending on the complexity of the HSA hardware, queues might be managed by any combination of software or hardware. Hardware managed queues have a significant performance advantage in the sense that an application running on latency processors (such as CPU 320) queues work to throughput processors (such as GPU 330) directly, without the need for any intervening operating system calls. This allows for very low latency communication between the devices in the HSA 300.

Figure 4:
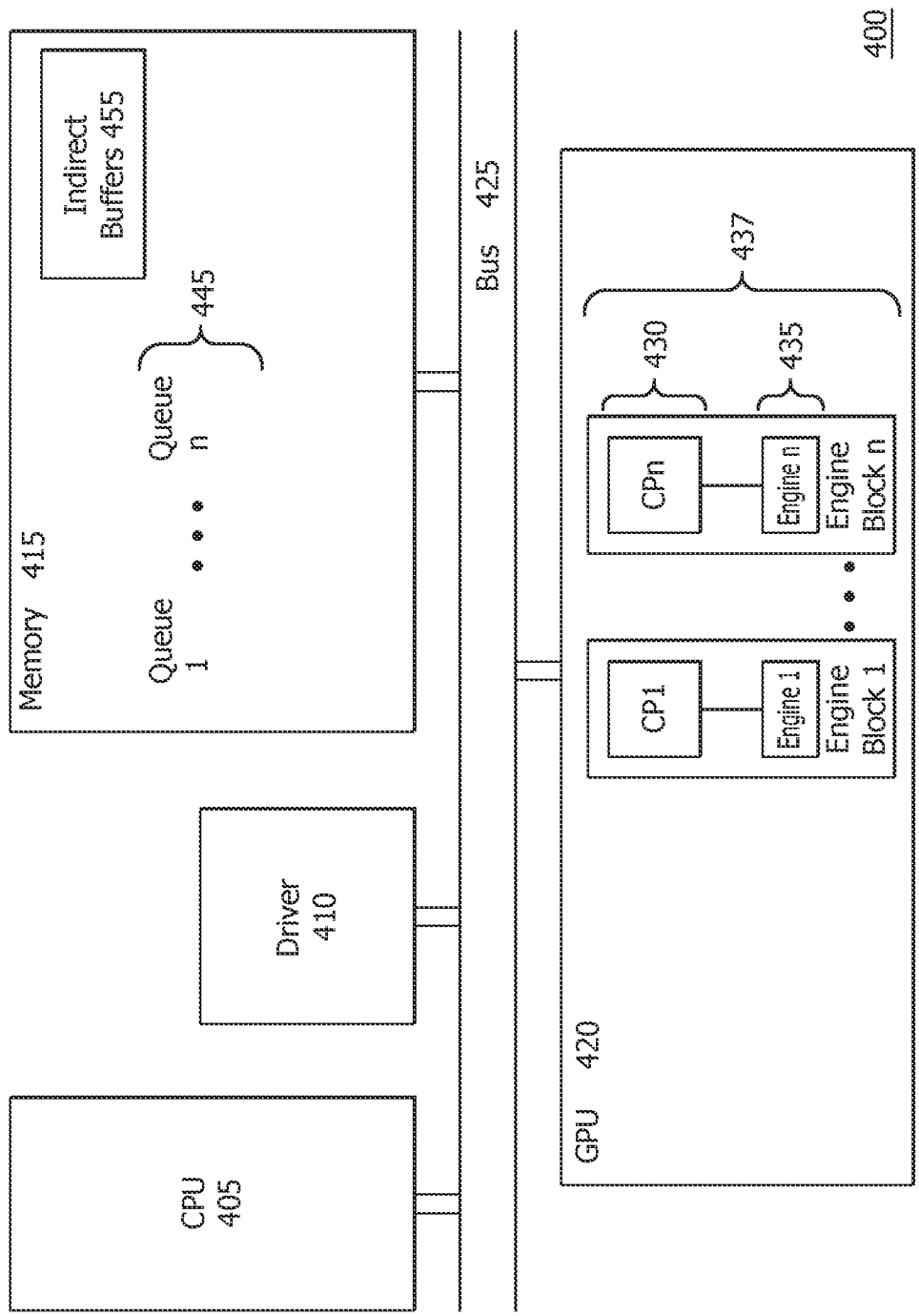
FIG. 4 is a block diagram of an example system illustrating queue structures in accordance with certain implementations.

FIG. 4 is a block diagram of an example system 400 illustrating queue structures. The system 400 includes a CPU 405, a system memory 415, a driver 410, a graphics processing unit (GPU) 420, and a communication infrastructure or bus 425. A person of skill in the art will appreciate that system 400 includes software, hardware, and firmware components in addition to, or different from, that shown in FIG. 4. It is understood that the system 400 includes additional components not shown in FIG. 4.

The CPU 405, GPU 420 and system memory 415 can be implemented as described with respect to FIGS. 1-3. The CPU 405 executes an operating system (not shown) and one or more applications, and is the control processor for system 400. The operating system executing on CPU 405 controls, facilitates access and coordinates the accomplishment of tasks with respect to system 400. The driver 410 (e.g., a graphics driver) includes software, firmware, hardware, or any combination thereof. In an implementation, the driver 410 is implemented entirely in software. The driver 410 provides an interface and/or application programming interface (API) for the CPU 405 and applications executing on the CPU 405 to access the GPU 420. The bus 425 provides coupling between the components of system 400 and includes one or more communication buses such as Peripheral Component Interconnect (PCI), Advanced Graphics Port (AGP), and the like.

The GPU 420 provides graphics acceleration functionality and other compute functionality as described herein to system 400. The GPU 420 includes multiple command processors (CP) CP 1 . . . CP n 430, and multiple engines Engine 1 . . . Engine n 435, for example, 3D engines, unified video decoder (UVD) engines, digital rights management (DRM) direct memory access (DMA) engines and the like.

The CP 1 . . . CP n 430 controls the processing within GPU 420 and is connected to Engine 1 . . . Engine n 435. Each CP 1 . . . CP n 430 is associated with Engine 1 . . . Engine n 435 and each pair is an engine block (EB) EB 1 . . . EB n 437. In another embodiment, the CP 1 . . . CP n 430 is a single command processor. In general, the CP 1 . . . CP n 430 receives instructions to be executed from the CPU 405, and coordinates the execution of those instructions on Engine 1 . . . Engine n 435 in GPU 420. In some instances, the CP 1 . . . CP n 430 generates one or more commands to be executed in GPU 420, that correspond to each command received from CPU 405. Logic instructions implementing the functionality of the CP 1 . . . CP n 430 is implemented in hardware, firmware, or software, or a combination thereof.

The memory 415 includes one or more memory devices and can be a dynamic random access memory (DRAM) or a similar memory device used for non-persistent storage of data. Memory 415 includes one or more memory buffers 445 through which CPU 405 communicates commands to GPU 420. The memory buffers 445 correspond to the engines 435 or the engine blocks 437, as appropriate. Memory buffers 445 are implemented as queues, ring buffers or other data structures suitable for efficient queuing of work items or command packets. In the instance of a queue, command packets are placed into and taken away from the memory buffers 445 in a circular manner. For purposes of illustration, memory buffers 445 are referred to as queue 1 . . . queue n 445 herein.

The memory 415 includes indirect buffers 455. The indirect buffers 455 hold the actual commands (e.g., instructions, data, pointers and non-pointers). For example, when the CPU 405 communicates a command packet to the GPU 420, the command packet is stored in the indirect buffer 455 and a pointer to that indirect buffer 455 is inserted in a queue 1 . . . queue n 445. As described herein below, certain of the indirect buffers 455 hold neuron data. That is, multiple indirect buffers are used for different purposes. The CPU 405, via driver 410, as a writer of the commands to queue 1 . . . queue n 445 and the GPU 420 as a reader of such commands, coordinate a write pointer and read pointer indicating the last item added and last item read, respectively, in queue 1 . . . queue n 445.

Figure 5A:
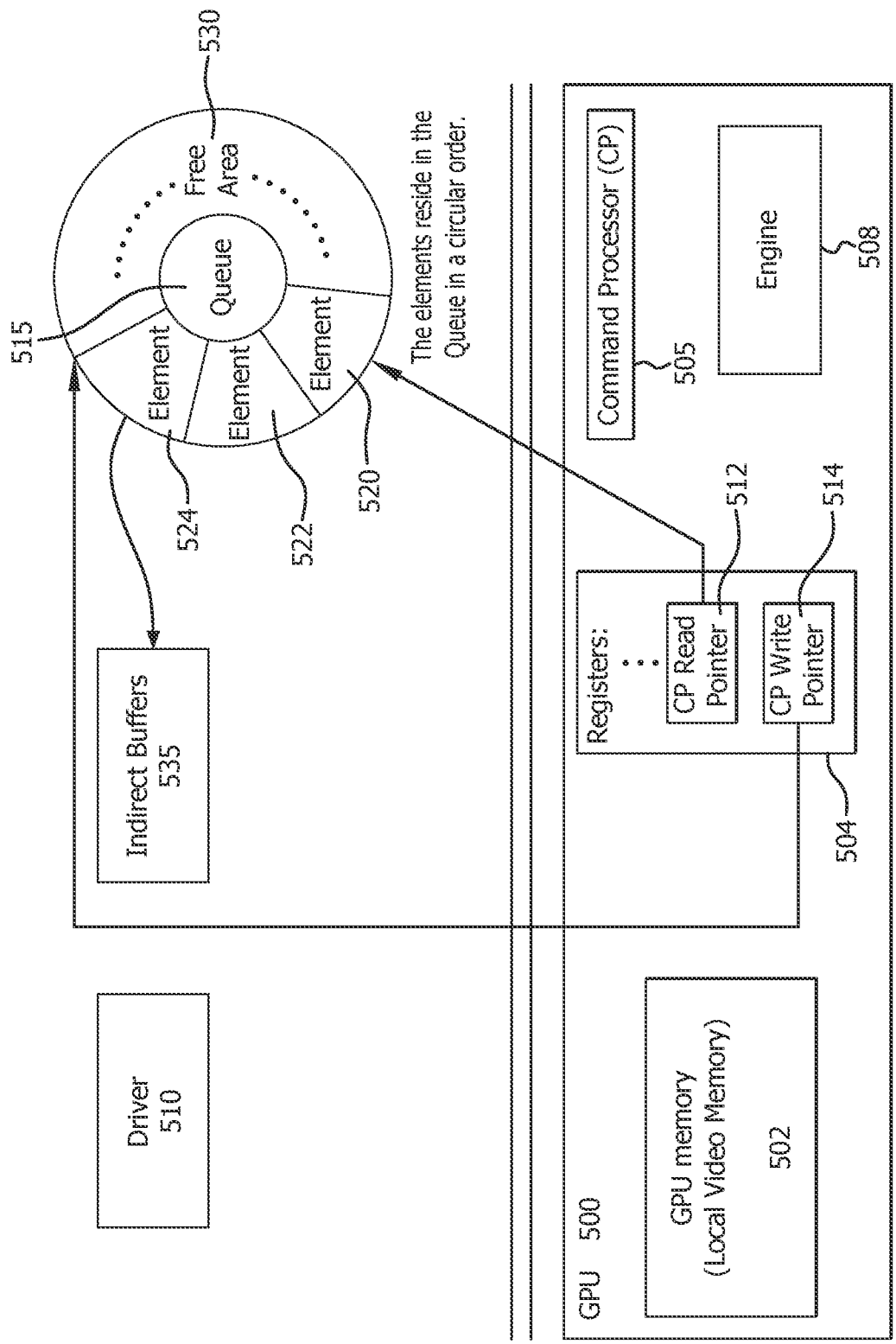
FIG. 5A is an example block diagram of command packet processing in accordance with certain implementations.
Figure 6:
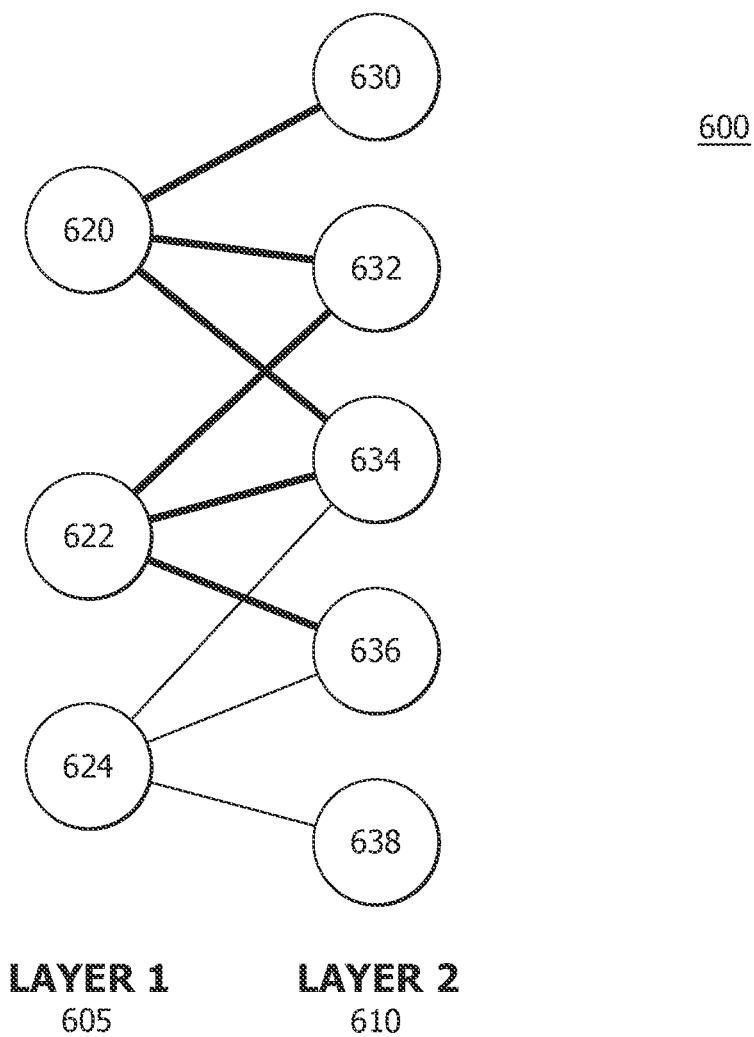
FIG. 6 illustrates two representative layers of a deep neural network (DNN)

FIG. 5A is an example block diagram of command packet processing as between a GPU 500, a driver 510, a queue 515 and indirect buffer 535. The GPU 500 includes a GPU memory 502, registers 504, a command processor 505, and an engine 508. The registers 504 include a read pointer 512 and a write pointer 514. The queue 515 includes elements 520, 522, 524 and free space 530. Each element, for example, elements 520, 522, 524 store queue packets. FIG. 5B shows an example element 570 that includes command packets 572 and an indirect buffer (IB) command packet 576 which points to the indirect buffer 535. The indirect buffer 535, as shown in FIG. 5C, includes command packets 540 which instruct the GPU 500 to carry out operations. For example, a kernel dispatch packet (an example of the command packet 540) in HSA includes information such as how a computation kernel should launch threads (grid dimension, workgroup size), required size of private and group memory allocations, handle for an object in memory that includes an executable ISA image for the computation kernel, and additional control and synchronization information. In general, the computation kernels, in DNN, are usually convolution, matrix multiply, fast Fourier transform (FFT), pooling, and activations which are implemented by high-level libraries such as for example MIOpen and rocBLAS.

The above architecture provides a one-way communication from a host processor (the writer as represented by the driver 510) to the GPU 500 (the reader as represented by the command processor 505). Initially the read pointer 512 and the write pointer 514 point to the same location indicating that the queue 515 is empty. The queue 515 has free space 530 into which the driver 510 writes a command packet corresponding to a task. The driver 510 then updates the write pointer 514 to one position past the last command packet or the first available space. The write pointer 514 and read pointer 512 are now pointing to different locations. The command processor 505 fetches command packets at the read pointer 512 position and walks the read pointer 512 until it is equal to the write pointer 514.

Convolutions in a neural network are a local operation, in that only the output from a few neurons is necessary to compute some of the neurons in a subsequent layer. As a result, computations in the subsequent layer can progress in parallel without waiting for all the neuron computations to be finished in the current layer. FIG. 6 illustrates two representative layers, layer 1 605 and layer 2 610, from a DNN 600 in a directed acyclic graph (DAG) representation. Layer 1 605 includes, for example, neurons 620, 622, and 624 and layer 2 610 includes, for example, neurons 630, 632, 634, 636 and 638. In some cases, some of the second layer neurons would be capable of running before the entire first layer had been evaluated. This is shown in FIG. 6 by the bolder and thicker lines, where two neurons, e.g., neurons 630 and 632, in the layer 2 610 can be evaluated before the final neuron, e.g., neuron 624, in the layer 1 605 was computed.

There are two cases where this is beneficial. First, the naive sequential execution of layers may leave some of the computational resources idle. In this case, those idle resources can be deployed in the next layer. Second, if the second layer requires substantially more work than the first layer, then starting on that layer earlier with several available compute resources may be more efficient. Modern DNNs have many hidden layers (hundreds or even thousands) and so it could be advantageous to begin computations many layers deep before finishing the computations in a single layer. However, to accurately predict what computations should be prioritized, the scheduler, such as for example scheduler 136 in FIG. 2, needs some knowledge of what the cost of any computation is expected to be.

The method and system described herein tags or associates certain architectural, functional or computational aspects, portions, characteristics or features (collectively "aspect or aspects") of a DNN system with metadata to permit more accurate job scheduling and load balancing, where the metadata provides a representative computational cost related to or associated with the certain DNN aspect. For example, these certain aspects of the DNN system can be a computation kernel, a neuron, a layer or some other aspect. In an illustrative example, the metadata is a kernel or filter size, a dropout layer, a number of neurons present in a layer, the activation function, and other like items which can be used to determine a computational cost. The aspects of the DNN system can be automatically tagged with the metadata by a framework as described herein, by applications or by a user, for example.

The metadata can be saved in a variety of places, including but not limited to, instructions, scalar registers, L1/L2 cache, a table and the like. In an implementation, the location is dependent on the size of the metadata, amenability to compression, where the metadata is captured and which scheduler is using the metadata.

In an illustrative example, some metadata, such as activation functions and the number of neurons per layer, are most easily captured by the software (e.g., programmer, compiler and the like) and are stored in job requests or instructions and other metadata need to be measured at runtime (e.g., kernel runtime) in hardware and are stored in a hardware table.

In another illustrative example, the location is dependent on which scheduler is using the metadata. If metadata is utilized at the O/S level, such as the O/S 120 in FIG. 2, the metadata can be embedded in a job request message, which is sent to the OS scheduler. If metadata is utilized at the hardware scheduler or dispatcher level, such as the scheduler 136 in FIG. 2 or hardware dispatcher 720 in FIG. 7, the metadata can be stored in a hardware table, such as hardware table 710, which is co-located with the scheduler 136 or hardware dispatcher 720. In the event that the hardware scheduler also utilizes metadata that are captured by the software (e.g., activation functions), the metadata can be passed from the software to the job request message, then to the OS, and finally to the hardware table.

The computational cost can be measured using a number of techniques. In an implementation, relationships between the kernel size and an evaluation time are used to determine the computational cost. In an illustrative implementation, different heuristics are used that recognize that a larger filter size corresponds to more work.

In another illustrative implementation, runtimes of kernels provide an indication of relative speed to determine the computational cost. This requires that a dispatcher perform a table-look up on the kernel size runtimes to distribute work. The estimated runtime is coupled with resource availability to efficiently dispatch a workgroup while balancing the load across compute resources.

In an implementation, frameworks, such as Tensorflow® (trademark of Google LLC) or MIOpen, provide the metadata that indicates the filter size for a particular layer or other like information. In an illustrative implementation, this is determined at the start of a run since the DNNs do not change on a substantial basis. This permits dynamic profiling of the kernels since it would not be a substantial cost for the entire run to just time the kernels after the first iteration.

In addition to using the computational costs for the kernels, the scheduler also needs to detect that some of the neurons in the subsequent layers are ready to execute. In an implementation, this is done by constructing a DAG of the computation being done in the DNN. The DAG permits the scheduler to allocate or deallocate locks for particular neurons, instead of limiting the computation to an entire layer. That is, the scheduler can expose particular neurons in a layer for use when other neurons are not needed or are being used. Once the scheduler has an entire graph of anticipated computations and the metadata, the scheduler uses a heuristic to schedule runs across the available computational resources to ensure efficient processing.

Figure 7:
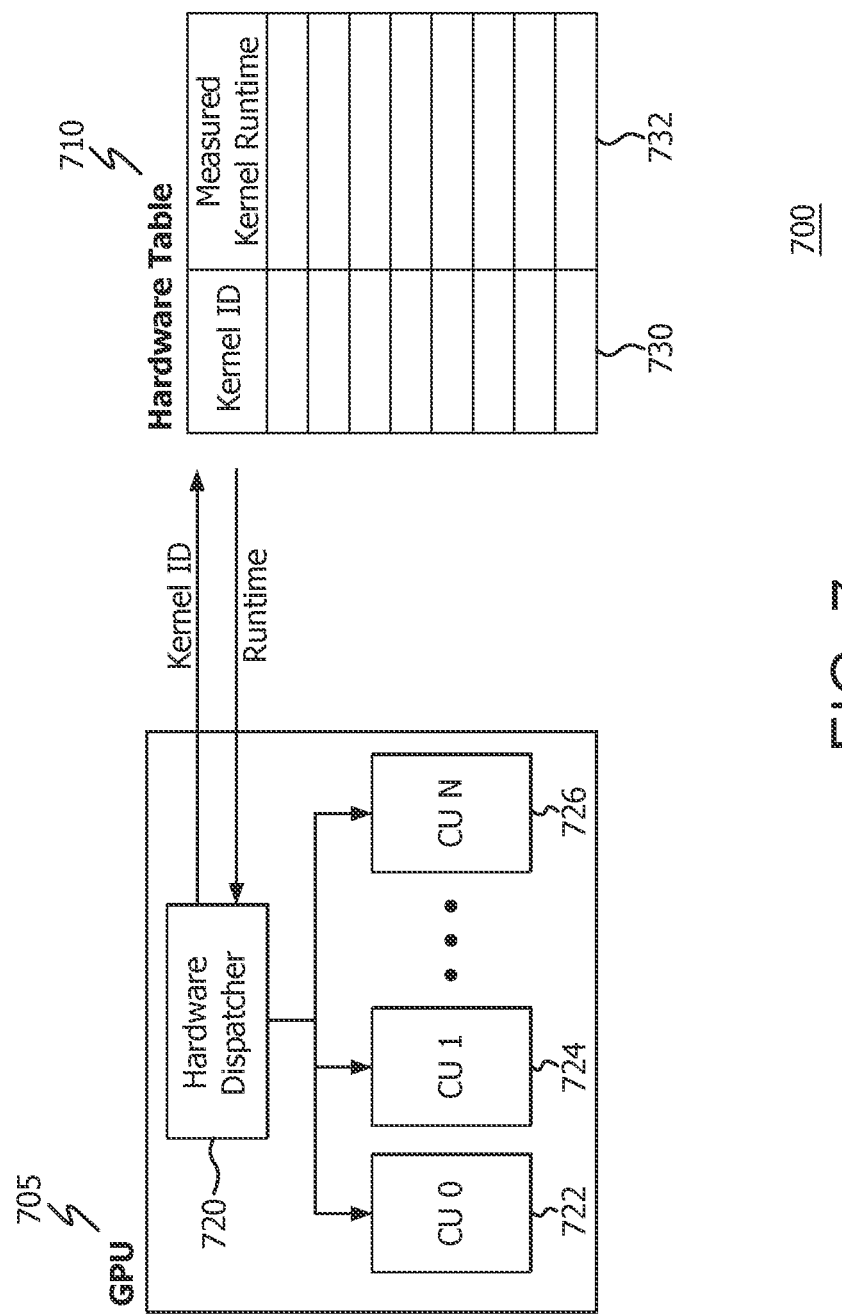
FIG. 7 is an example block diagram for determining computational costs using computation kernels in a DNN system in accordance with certain implementations.

FIG. 7 is an example block diagram for determining computational costs using computation kernels in a DNN system 700 to permit more accurate job scheduling and load balancing. In this implementation, the computational cost is kernel runtimes which are stored as metadata in a table. The DNN system 700 includes at least a processor, such as a GPU 705, which is in communication with or in connected to a table, where the table is for example a hardware table 710. For example, the table can be implemented in a memory, a register, a cache or other like space. The GPU 705 includes at least a dispatcher, such as a hardware dispatcher 720 which is in communication with a plurality of compute units (CUs) CU 0 722, CU 1 724, . . . , CU N 726. The hardware table 710 associates kernel IDs 730 with measured kernel runtimes 732. In an implementation, kernel runtime measurements may need to be done only once due to the regularity of certain types of DNNs, such as convolutional neural networks (CNNs).

When determining work distribution, the hardware dispatcher 720 considers the metadata associated with each kernel. In this illustration, the metadata is the measured kernel runtime. For example, the hardware dispatcher 720 considers the measured kernel runtimes 732 for each of the kernels by looking up the kernel IDs 730 and retrieving the associated measured kernel runtimes 732. In an implementation, the hardware dispatcher 720 uses the measured kernel runtimes 732 in conjunction with processor or compute unit resources to efficiently dispatch a workgroup while balancing the load across the processor or compute unit resources.

In an implementation, metadata is applicable to dynamic pruning and sparsity of the DNN. In these cases, individual neurons are randomly cut out or removed from the DNN. A dynamic means of evaluating and dispatching work would permit load balancing between individual iterations. A means to accomplish this would be permitting the scheduler or a separate helper thread, for example, to check the readiness of a neuron to be computed, where readiness refers to or accounts for the dependencies of each neuron (which can be precomputed). This information, i.e., the readiness, would be tagged as metadata for that neuron. For example, when a neuron is pruned, the readiness of all dependent neurons is updated and is used by the scheduler to load balance between individual iterations.

In an implementation, the metadata is used between multiple devices, where the metadata permits overlapping computation and communication (whether between devices or CUs) by starting to perform computations on subsequent layers that were not waiting for data to be locally stored.

Figure 8:
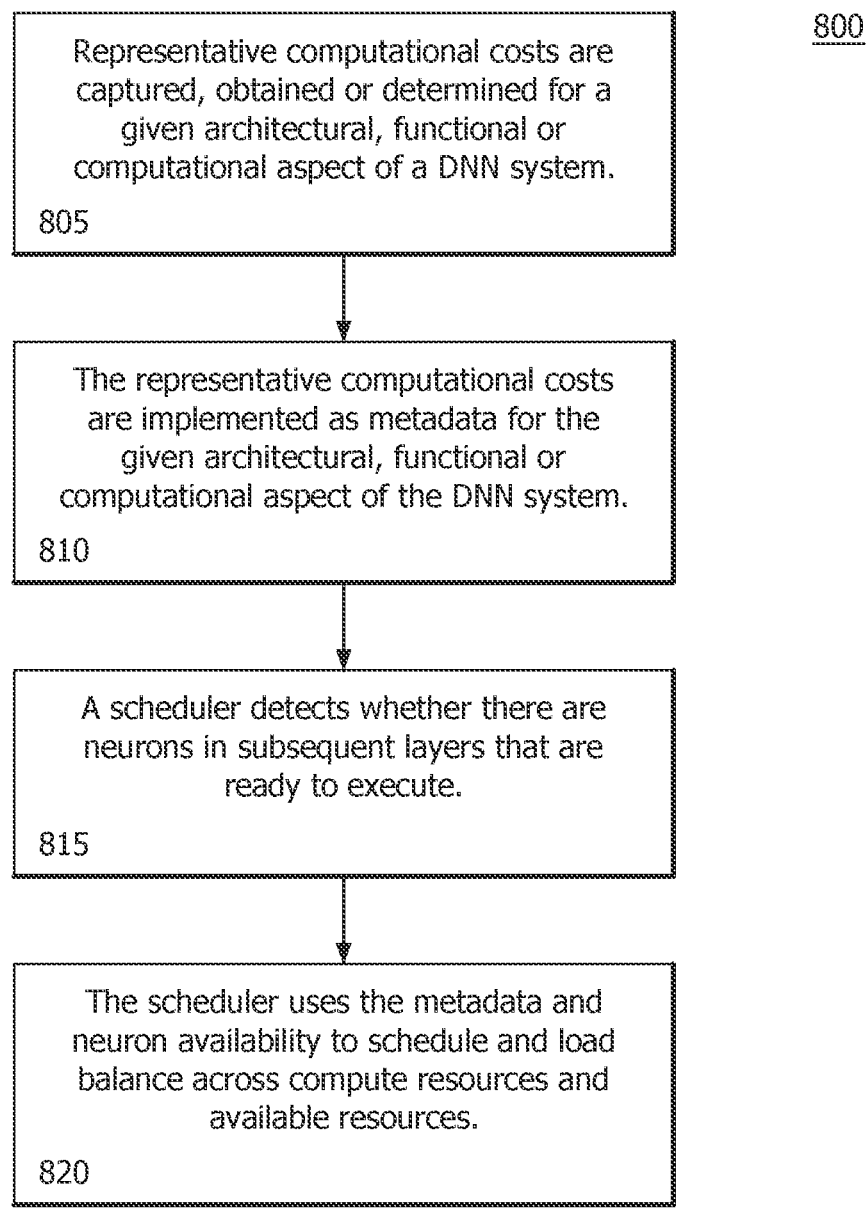
FIG. 8 is a flowchart for a method for opportunistic load balancing in DNNs using metadata in accordance with certain implementations.

FIG. 8 is a flowchart for a method 800 for opportunistic load balancing in DNNs using metadata. Representative computational costs are captured, obtained or determined for a given architectural, functional or computational aspect of a DNN system (step 805). The representative computational costs are implemented as metadata for the given architectural, functional or computational aspect of the DNN system (step 810). In an implementation, the computed computational cost is implemented as the metadata. A scheduler detects whether there are neurons in subsequent layers that are ready to execute (step 815). The scheduler uses the metadata and neuron availability to schedule and load balance across compute resources and available resources (step 820).

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements aspects of the embodiments.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for load balancing in a neural network system that improves computational efficiency of the neural network system, the method comprising:
    tagging any one or a combination of one or more kernels, one or more neurons, and one or more layers of the neural network system with metadata;
    detecting that there are resources available for execution of a neuron in a subsequent layer of the neural network system; and
    in response to the detecting that there are resources available for execution:
        performing the load balancing in the neural network system using the metadata, and
        executing computations of the neuron in the subsequent layer of the neural network system according to the load balancing.

2. The method of claim 1, wherein the load balancing includes the subsequent layer and one or more layers subsequent to the subsequent layer.

3. The method of claim 1, wherein the load balancing is performed while a current layer is being processed.

4. The method of claim 1, wherein the metadata indicates any one or a combination of a kernel size, a filter size, a dropout layer, a number of neurons present in a layer, neuron readiness, or an activation function.

5. The method of claim 4, wherein the neuron readiness accounts for dependencies between neurons.

6. The method of claim 5, wherein the neuron readiness is updated after a neuron associated with the neuron readiness is pruned.

7. The method of claim 1, wherein the metadata is tagged by any one or a combination of an application, a framework, or a user.

8. The method of claim 1, wherein the metadata is stored in any one or a combination of an instruction, a scalar register, a memory, and a hardware table.

9. The method of claim 1, further comprising:
obtaining representative computational costs for the neural network system, wherein a computational cost is determined from the representative computational costs; and
storing the computational costs for the neural network system as a component of the metadata.

10. A system for load balancing in a neural network system that improves computational efficiency of the neural network system, comprising:
one or more kernels, one or more neurons, and one or more layers, wherein any one or a combination of the one or more kernels, neurons, and layers of the neural network system are tagged with metadata; and
a scheduler connected to the neural network system, where the scheduler is configured to:
detect that there are resources available for execution of a neuron in a subsequent layer of the neural network system; and
in response to detecting that there are resources available for execution:
perform the load balancing of the neural network system using the metadata, and
execute computations of the neuron in the subsequent layer of the neural network system according to the load balancing.

11. The system of claim 10, wherein the load balancing includes the subsequent layer and one or more layers subsequent to the subsequent layer.

12. The system of claim 10, wherein the load balancing is performed while a current layer is being processed.

13. The system of claim 10, wherein the metadata indicates any one or a combination of a kernel size, a filter size, a dropout layer, a number of neurons present in a layer, neuron readiness, or an activation function.

14. The system of claim 13, wherein the neuron readiness accounts for dependencies between neurons.

15. The system of claim 14, wherein the neuron readiness is updated after a neuron associated with the neuron readiness is pruned.

16. The system of claim 10, wherein the metadata is tagged by any one or a combination of an application, a framework, or a user.

17. The system of claim 10, wherein the metadata is stored in at least an instruction, a scalar register, a memory, and a hardware table.

18. The system of claim 10, wherein the metadata includes computational costs for the neural network system, a computational cost being determined from obtained representative computational costs for the neural network system.

* * * * *